United States Patent [19]

Boatman

[11] Patent Number: 5,012,059

[45] Date of Patent: Apr. 30, 1991

[54] APPLIANCE FOR HEATING WATER BY MICRO WAVE POWER

[75] Inventor: John M. Boatman, Portland, Oreg.

[73] Assignees: Donald C. Riddle, Portland; William M. Bernard, Jr., Beaverton, both of Oreg.; part interest to each

[21] Appl. No.: 350,611

[22] Filed: May 10, 1989

[51] Int. Cl.⁵ .............................................. H05B 6/80
[52] U.S. Cl. ......................... 219/10.55 E; 219/10.55 F; 99/306; 99/DIG. 14
[58] Field of Search ................. 219/10.55 E, 10.55 R, 219/10.55 F, 10.55 D; 99/306, 307, 295, DIG. 14, 451; 426/241, 234, 243

[56] References Cited

U.S. PATENT DOCUMENTS

| | | | |
|---|---|---|---|
| 3,592,125 | 7/1971 | Tolmie | 99/307 |
| 3,691,934 | 9/1972 | Horn et al. | 99/307 |
| 3,696,733 | 10/1972 | Beverett | 99/307 |
| 3,974,354 | 8/1976 | Long | 219/10.55 E |
| 4,104,957 | 8/1978 | Freedman et al. | 219/10.55 E |
| 4,381,696 | 5/1983 | Koral | 219/10.55 E |
| 4,439,656 | 3/1984 | Peleg | 99/451 |
| 4,642,443 | 2/1987 | Jorgensen et al. | 219/10.55 E |
| 4,660,466 | 4/1987 | Fries et al. | 99/295 |
| 4,908,222 | 3/1990 | Yu | 219/10.55 E |

Primary Examiner—Philip H. Leung
Attorney, Agent, or Firm—Dellett, Smith-Hill and Bedell

[57] ABSTRACT

An appliance for dispensing hot water comprises walls defining a reservoir for receiving water to be heated, a filling aperture for introducing water into the reservoir, a heating chamber located at least partially above the reservoir, and a discharge aperture for allowing heated water to leave the heating chamber. The appliance further comprises a tube extending upwardly from the reservoir and opening into the heating chamber, and a plug for sealing the filling aperture. The walls are at least partially transparent to microwave radiation so that when the appliance is exposed to microwave radiation, water in the reservoir is heated and is forced from the reservoir through the tube into the heating chamber, where it is further heated and is discharged from the heating chamber by way of the discharge aperture.

8 Claims, 2 Drawing Sheets

APPLIANCE FOR HEATING WATER BY MICRO WAVE POWER

BACKGROUND OF THE INVENTION

This invention relates to an appliance for dispensing hot water, and more particularly, but not exclusively, to an appliance for brewing coffee.

A conventional drip coffee brewing appliance comprises a water reservoir for receiving cold water, and an electrically heated hot plate on which a carafe for receiving brewed coffee beverage is placed. A filter for receiving coffee grounds is placed in the open neck of the carafe. A tube extends from the bottom of the reservoir to a location over the filter. The tube passes under the hot plate, so that water in the tube is heated. The water is partially vaporized, and is forced upwards through the tube so that it is discharged into the filter. This type of appliance is subject to disadvantage in that the coffee beverage in the carafe continues to be heated so long as the hot plate is energized, and it is widely accepted that the flavor of a coffee beverage is degraded if the beverage is heated.

The microwave oven is used for a wide variety of heating tasks. It is well known to use a microwave oven to reheat coffee beverage.

Several devices for brewing coffee in a microwave oven have been proposed. For example, U.S. Pat. No. 4,104,957 issued Aug. 8, 1978 (Freedman et al) discloses a coffee brewing appliance comprising a carafe, a filter that fits in the neck of the carafe, and a reservoir located over the filter. The reservoir communicates with the filter by way of a thermally controlled valve. Therefore, when water in the reservoir is heated by microwave radiation, the valve opens and allows the water to flow into the filter for extracting coffee constituents from coffee grounds in the filter, so that a coffee beverage accumulates in the carafe.

U.S. Pat. No. 4,577,080 issued Mar. 18, 1986 (Grossman) discloses an appliance similar to that of Freedman et al, except that instead of using a thermally controlled valve to prevent cold water from the reservoir from contacting the coffee grounds in the filter, a body of non-toxic wax that melts when the water reaches the desired temperature is employed.

U.S. Pat. No. 4,721,835 issued Jan. 26, 1988 (Welker) discloses a device for brewing coffee in microwave oven. The device comprises a jug having a top configured as a filter. Water and coffee grounds are placed in the jug, and the filter is fitted in the mouth of the jug. When the coffee has brewed, it can be poured from the jug and the coffee grounds are retained by the filter.

U.S. Pat. No. 4,386,109 issued May 31, 1983 (Bowen et al) discloses an espresso coffee brewer for use in a microwave oven. The device disclosed by Bowen et al is generally similar to that of Freedman et al, except that instead of employing a thermally controlled valve to prevent flow of cold water through the coffee grounds, the coffee grounds are compressed so that they themselves form a seal. The reservoir is closed at the top, so that when the water in the reservoir is heated, the pressure rises sufficiently to force steam and water through the coffee grounds into the carafe.

U.S. Pat. No. 4,381,696 issued May 3, 1983 (Koral) discloses a coffee brewing appliance that is generally similar to that disclosed by Freedman et al.

U.S. Pat. No. 4,345,512 issued Aug. 24, 1982 (Moore) discloses a tea infuser for use in a microwave oven. The tea infuser, instead of being made of metal as is conventional, is made of a microwave transparent synthetic plastic material.

It has accordingly been well recognized that it would be convenient to be able to brew coffee or other beverages in a microwave oven. However, the known devices for accomplishing this are all subject to substantial disadvantages, such as the need for moving parts or foreign substances to control flow of water into contact with the coffee grounds.

SUMMARY OF THE INVENTION

In accordance with the present invention, an appliance for dispensing hot water, comprises wall means defining a reservoir for receiving water to be heated, a filling aperture for introducing water into the reservoir, a heating chamber located at least partially above the reservoir, and a discharge aperture for allowing heated water to leave the heating chamber. The appliance further comprises means defining a conduit extending upwardly from the reservoir and opening into the heating chamber, and a plug for sealing the filling aperture. At least part of the wall means is substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir through the conduit into the heating chamber, where it is further heated and is discharged from the heating chamber by way of the discharge aperture.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
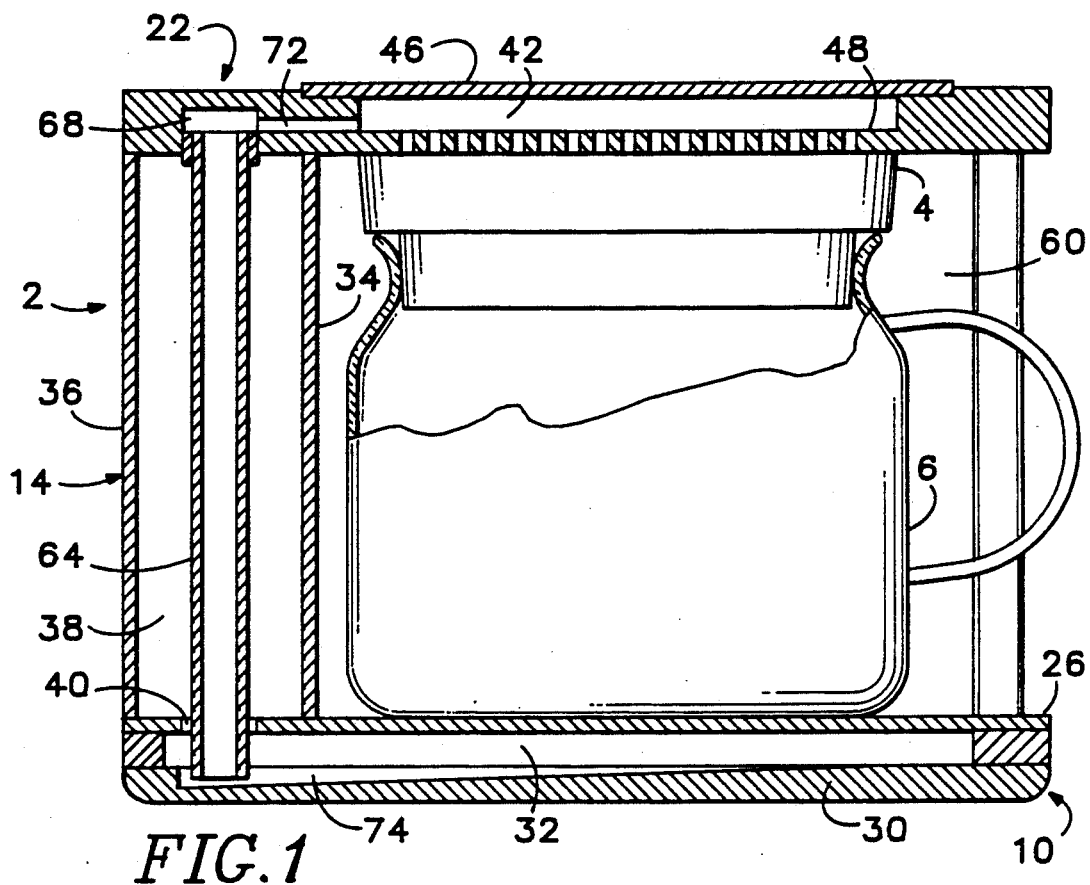
FIG. 1 is a vertical sectional view of a coffee brewing appliance embodying the present invention.
Figure 2:
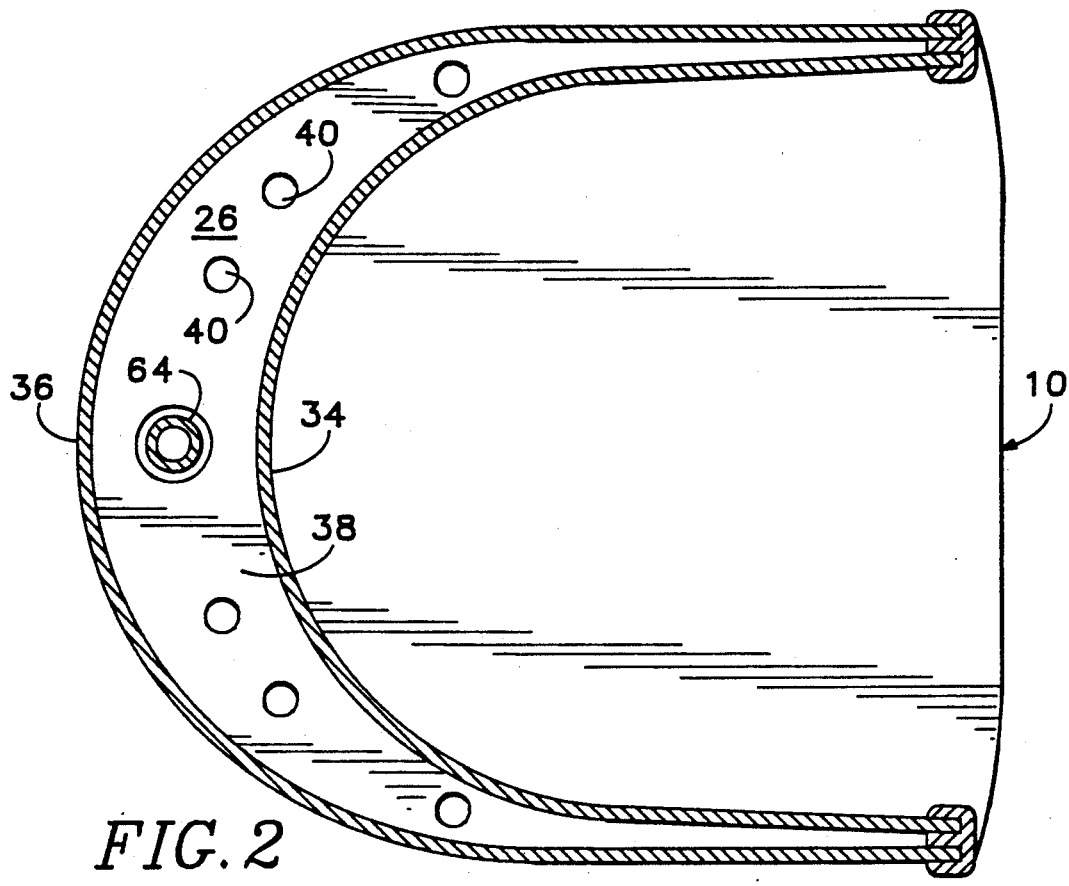
FIG. 2 is a horizontal sectional view taken on the line II—II of FIG. 1.
Figure 3:
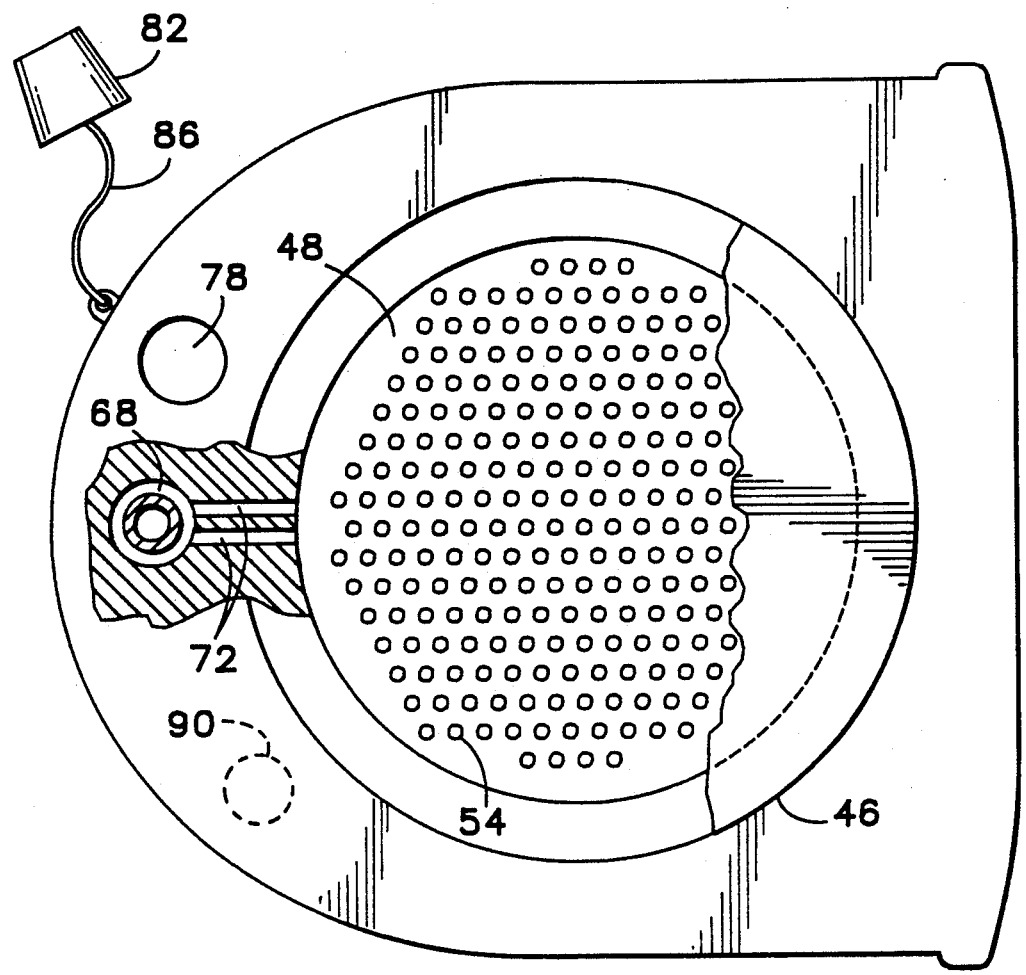
FIG. 3 is a top plan view of the appliance, partially broken away.
Figure 4:
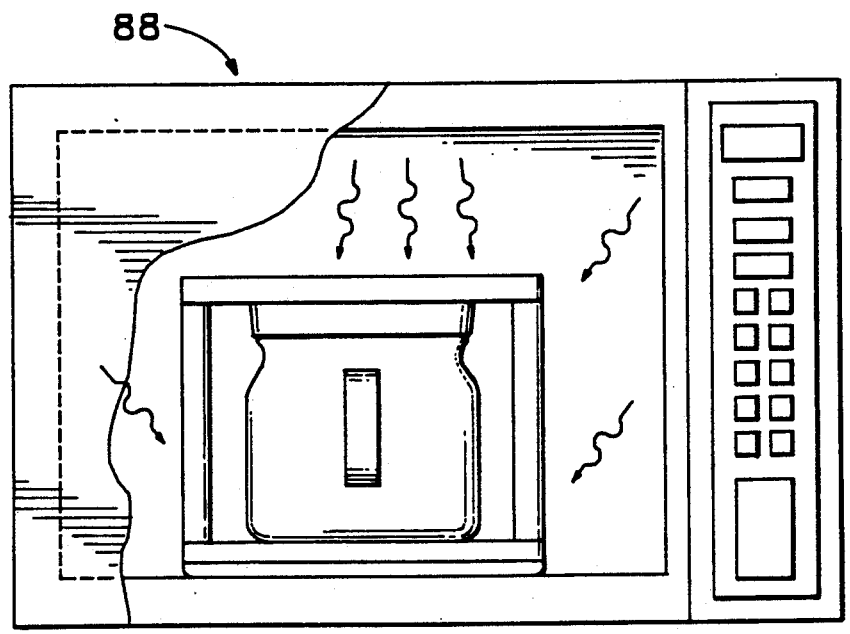
FIG. 4 is a cut away view of a microwave oven containing the appliance shown in FIGS. 1-3.

The coffee brewing appliance shown in the drawings comprises three distinct components, namely a reservoir and water heater 2, a filter 4 and a carafe 6. Reservoir and water heater 2 is made of synthetic polymer material, with a polysulfone base and multilayered resins with metal inserts that absorb microwave radiation, and comprises a base 10, a sidewall 14, and a top 22. Base 10 is composed of upper and lower walls 26, 30 which are spaced from one another so as to define a first reservoir chamber 32 therebetween. Sidewall 14 comprises inner and outer sidewalls 34, 36 which also are spaced apart and define a second reservoir chamber 38 therebetween. Second reservoir chamber 38 is in open communication with first reservoir chamber 34 through apertures 40 in upper wall 26 of base 10. Top 22 defines a circular heating chamber 42 covered by a plate 46. Plate 46 is transparent to microwave radiation. The lower wall 48 of heating chamber 42 is formed with multiple apertures 54 to allow water in chamber 42 to drip from the chamber.

As in the case of a conventional drip coffee brewer, filter 4 sits in the neck of carafe 6. Filter 4 comprises a filter receptacle in which a filter element, e.g. of paper or metal gauze, sits. Alternatively, filter 4 may have a filter element of metal gauze formed integrally therewith.

Sidewall 14 is generally U-shaped in horizontal section, and, in conjunction with base 10 and top 22, defines a recess 60 that receives the carafe and filter. The diameter of the upper rim of filter 4 is substantially equal to the diameter of heating chamber 42. When the carafe and filter are properly located in recess 60, the rim of filter 4 is closely adjacent lower wall 48 of heating chamber 42 and filter 4 is coaxial with chamber 42 so that any water that drips from apertures 54 will fall into filter 4.

A tube 64 extends vertically within second reservoir chamber 38 and is secured at its upper end to top 22. Top 22 is formed with a cavity 68 into which tube 64 opens at its upper end, and with passages 72 extending from cavity 68 to heating chamber 42. Tube 64 is made of synthetic plastic material but is coated with conductive material, such as aluminum, which reflects microwave radiation, so that water is not heated by absorption of microwave radiation while it is inside tube 64. Similarly, top 22 is coated with conductive material in the vicinity of cavity 68 and passages 72 in order to prevent water in the cavity and passages from being heated by absorption of microwave radiation. Lower wall 30 of base 10 is formed with a collecting groove 74. The lower end of tube 64 extends into this groove, the depth of which increases towards the bottom of tube 64.

Top 22 is also formed, with a filling hole 78, which opens into second reservoir chamber 38. A plug 82, which is attached to reservoir and heater 2 by a cord 86, can be fitted in filling hole 78.

In use of the coffee brewing appliance illustrated in the drawings, coffee grounds are placed in filter 4 and filter 4 is placed in the neck of carafe 6. Carafe 6 with filter 4 seated in its neck is placed in recess 60. A suitable quantity of water is poured into reservoir chamber 38 through filling hole 78, and plug 82 is placed sealingly in filling hole 78. The water in chamber 38 drains through holes 40 in upper wall 26 of base 10 to fill chamber 34. Chamber 38 is at least partially filled. The coffee brewing appliance is then placed in a microwave oven 88 and the microwave oven is turned on. The microwave radiation emitted by the oven's microwave source (not shown) is absorbed by the water in reservoir chambers 34, 38, resulting in heating of the water. Since filling hole 78 is sealed by plug 82, the heating of water in chambers 34 and 38 results in an increase in pressure in those chambers, and consequently water is forced upwardly through tube 64, cavity 68 and passages 72 into heating chamber 42. Heating chamber 42 has a large horizontal sectional area but very little height, and consequently water that enters heating chamber 42 forms a relatively thin sheet. Apertures 54 are sufficiently small that the water in chamber 42 does not immediately drain into filter 4. Since heating chamber 42 is at the top of the appliance, and the microwave energy source of most microwave ovens is positioned to direct microwave energy downwardly from the top of the oven, heating chamber 42 is well positioned to absorb microwave energy, resulting in efficient heating of water in chamber 42. When the water in chamber 42 is heated, its surface tension is reduced and it drains more readily through apertures 54 into filter 4, where it contacts the coffee grounds and forms a coffee beverage that drips from filter 4 into carafe 6. When all the water has been discharged from chambers 34 and 38, and coffee beverage has stopped dripping from filter 4, the microwave oven can be turned off. The carafe can then be removed from recess 60 and filter 4 replaced with a suitable cover that fits in the neck of carafe 6. The coffee beverage remains hot in the carafe, which is preferably made of thermally insulating material.

Since chambers 32 and 38 are quite thin and therefore the body of water in chambers 32, 38 has a large surface area, microwave radiation is absorbed efficiently by the water in these chambers and little microwave radiation is lost. Therefore, the water in chambers 32 and 38 is efficiently preheated. It has been found that the larger the surface area of the body of water confined in reservoir and heater 2, the more efficient is the heating of the water. The configuration and location of heating chamber 42 ensure that the water falling onto the coffee grounds in filter 4 is hot, but not boiling. Since the coffee brewing appliance does not rely on a hot plate for its operation, the brewed coffee beverage in the carafe is not heated after it has been brewed, and degradation of the taste of the coffee beverage is avoided.

It is necessary that plug 82 be able to relieve pressure in chambers 34 and 38 should tube 64 or passages 72 become blocked. Therefore, plug 82 is made of a soft rubbery material that does not bite into the material of top 22.

It will be appreciated that the present invention is not restricted to the particular embodiment that has been described and illustrated, and that variations may be made therein without departing from the scope of the invention as defined in the appended claims and equivalents thereof. For example, even though plug 82 is attached to reservoir and heater 2 by cord 86, there is always a possibility that plug 82 will be lost and replaced by a plug that can be jammed in filling hole 78, and in order to protect against this unlikely possibility, top 22 may be formed with a blind hole 90 extending upwards from above chamber 38 and stopping a small distance short of the upper surface of top 22. The thin web at the top of hole 90 will break when the pressure in chambers 34 and 38 reaches a selected limit, providing pressure relief.

Although the reservoir and heater of the illustrated appliance have been made from sheet material by appropriately cutting, bending and bonding sheet material, it is preferred that the reservoir and heater be made by casting components and then bonding the components together. For example, upper wall 26 and inner sidewall 34 could be cast as a single component and lower wall 30 and outer sidewall 36 cast as a second component, and these two components bonded together and to top 22. Suitable moldable synthetic polymer materials containing inclusions of metal are sold by General Electric Company under the designations ULTEM and P.E.I.

I claim:

1. An appliance for dispensing hot water, comprising: wall means defining a reservoir for receiving water to be heated, a filling aperture for introducing water into the reservoir, a heating chamber located at least partially above the reservoir, and a discharge aperture for allowing heated water to leave the heating chamber, the wall means comprising first wall means bounding the reservoir horizontally and second wall means which define the heating chamber and bound the reservoir vertically at its top, the reservoir having a bottom surface, a tube extending in the reservoir and defining a passage having first and second open ends, the first end of the passage being close to the bottom surface of the reservoir and the passage being in open communication with the reservoir by way of its first end and not otherwise and opening into the heating chamber at its second end, and a plug for sealing the filling aperture, at least part of the wall means being substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir through the passage into the heating chamber, where it is further heated and is discharged from the heating chamber by way of the discharge aperture.

2. An appliance according to claim 1, wherein the second wall means define a passage that extends from the second end of the passage defined by the tube and opens into the heating chamber.

3. An appliance according to claim 1, wherein the first wall means comprise first and second vertical walls which are horizontally spaced and bound the reservoir horizontally, the vertical and horizontal extend of each wall being substantially greater than the horizontal space between the walls.

4. An appliance according to claim 3, wherein the first and second walls are substantially U-shaped in horizontal section, whereby the wall means define a recess, and the appliance further comprises a vessel adapted to fit in the recess for receiving heated water discharged from the heating chamber.

5. An appliance for dispensing hot water, comprising:

wall means defining a reservoir for receiving water to be heater, a filling aperture for introducing water into the reservoir, which has a bottom surface, a heating chamber located at least partially above the reservoir, and a discharge aperture for allowing heated water to leave the heating chamber, the first wall means including first and second vertical walls which are horizontally spaced and bound the reservoir horizontally, the vertical and horizontal extent of each wall being substantially greater than the horizontal space between the walls, and the first and second walls being substantially U-shaped in horizontal section, whereby the wall means define a recess, a vessel adapted to fit in the recess for receiving heated water discharged from the heating chamber, conduit means defining a passage having first and second open ends, the first end of the passage being close to the bottom surface of the reservoir and the passage being in open communication with the reservoir by way of its first end and not otherwise and opening into the heating chamber at its second end, and a plug for sealing the filling aperture, at least part of the wall means being substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir through the passage into the heating chamber, where it is further heated and is discharged from the heating chamber by way of the discharge aperture.

6. An appliance for dispensing hot water, comprising:

wall means defining a reservoir for receiving water to be heated and a filling aperture for introducing water into the reservoir, said wall means comprising upper and lower horizontal walls bounding a first reservoir chamber, the upper and lower horizontal walls being generally planar and being spaced apart by a distance that is substantially less than the horizontal extend of the first reservoir chamber, and first and second vertical walls which are horizontally spaced and bound a second reservoir chamber horizontally, the second reservoir chamber being vertically bounded at the bottom by said upper wall, said upper wall being formed with apertures providing direct open communication between the first and second reservoir chambers, conduit means defining a passage having first and second open ends, the first end of the passage being close to said lower horizontal wall and the passage extending upwardly from its first end, the passage being in open communication with the reservoir by way of its first end and not otherwise, and a plug for sealing the filling aperture, at least part of the wall means being substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir into the passage and is discharged from the passage by way of the second end thereof.

7. Apparatus for brewing a hot beverage by contacting solid material containing the essence of the beverage with hot water and thereby extracting the beverage essence from the solid material, the appliance comprising:

wall means defining a reservoir for receiving water to be heated, a filling aperture for introducing water into the reservoir, and a heating chamber located at least partially above the reservoir, said wall means including upper and lower horizontal walls which are vertically spaced and bound the heating chamber vertically, the lower wall being below the upper wall and being formed with a plurality of discharge apertures for allowing heated water to leave the heating chamber, each of said discharge apertures being much smaller in horizontal extend than the heating chamber, whereby surface tension effects restrict discharge of water from the heating chamber until the water has reached a predetermined temperature, means defining a conduit extending upwardly form the reservoir and opening into the heating chamber, a container for receiving hot beverage, the container having an open neck, a filter for receiving solid material, said filter being adapted to be seated removably in the open neck of the container, and a plug for sealing the filling aperture defined by the wall means, at least part of the wall means being substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir through the conduit into the heating chamber, where it is further heated and is discharged from the heating chamber by way of the discharge apertures and enters the filter, where it contacts the solid material and extracts beverage essence from the solid material, and drips from the filter into the container.

8. An appliance for dispensing hot water, comprising:

wall means defining a reservoir for receiving water to be heated, a filling aperture for introducing water into the reservoir, a heating chamber located at least partially above the reservoir, which has a bottom surface, said wall means including upper and lower horizontal walls which are vertically spaced and bound the heating chamber vertically, the lower wall being below the upper wall and being formed with a plurality of discharge apertures for allowing heated water to leave the heating chamber, each of the discharge apertures being much smaller in horizontal extend than the heating chamber, whereby surface tension effects restrict discharge of water from the heating chamber until the water has reached a predetermined temperature, conduit means defining a passage having first and second open ends, the first end of the passage being close to the bottom surface of the reservoir and the passage being in open communication with the reservoir by way of its first end and not otherwise and opening into the heating chamber at its second end, and a plug for sealing the filling aperture, at least part of the wall means being substantially transparent to electromagnetic radiation within a range of wavelengths that is selected to be such that electromagnetic radiation in that range is absorbed by water, so that when the appliance is exposed to electromagnetic radiation in the selected range of wavelengths, water in the reservoir is heated and is forced from the reservoir through the passage into the heating chamber, where it is further heated and is discharged from the heating chamber by way of the discharge aperture.

* * * * *